United States Patent
Tapse

(10) Patent No.: US 12,212,811 B2
(45) Date of Patent: Jan. 28, 2025

(54) METHODS AND APPARATUS FOR DYNAMIC MEDIA INSERTION BASED ON STREAMING METER DATA

(71) Applicant: The Nielsen Company (US), LLC, New York, NY (US)

(72) Inventor: Sandeep Tapse, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 37 days.

(21) Appl. No.: 17/877,499

(22) Filed: Jul. 29, 2022

(65) Prior Publication Data

US 2023/0217069 A1 Jul. 6, 2023

Related U.S. Application Data

(60) Provisional application No. 63/295,414, filed on Dec. 30, 2021.

(51) Int. Cl.
*H04N 21/442* (2011.01)
*H04N 21/24* (2011.01)

(52) U.S. Cl.
CPC ... *H04N 21/44204* (2013.01); *H04N 21/2407* (2013.01)

(58) Field of Classification Search
CPC .............. H04N 21/44204; H04N 21/2407
See application file for complete search history.

(56) References Cited

U.S. PATENT DOCUMENTS

| | | | |
|---|---|---|---|
| 8,340,011 B2 * | 12/2012 | Kenagy | H04H 20/26 370/312 |
| 2016/0112740 A1 * | 4/2016 | Francisco | H04N 21/25883 725/12 |
| 2017/0064411 A1 * | 3/2017 | Goli | H04N 21/6125 |
| 2018/0084313 A1 * | 3/2018 | Splaine | H04N 21/44204 |
| 2018/0192105 A1 * | 7/2018 | Loheide | H04N 21/44226 |
| 2020/0177966 A1 * | 6/2020 | Kerkes | H04N 21/2402 |

FOREIGN PATENT DOCUMENTS

WO WO-2012055023 A1 * 5/2012 ......... H04L 41/5038

* cited by examiner

*Primary Examiner* — Chenea Davis

(57) ABSTRACT

Methods, apparatus, systems, and articles of manufacture are disclosed to perform dynamic media insertion based on streaming meter data. An example apparatus includes meter data management circuitry to obtain, via a network, streaming meter data from a plurality of streaming meter devices, the streaming meter data including streaming sessions detected by the plurality of streaming meter devices, meter data processor circuitry to identify active streaming sessions based on the streaming meter data, trend analyzer circuitry to generate a viewing trend indicator based on the active streaming sessions, and trend reporter circuitry to transmit the viewing trend indicator via a network.

20 Claims, 8 Drawing Sheets

METHODS AND APPARATUS FOR DYNAMIC MEDIA INSERTION BASED ON STREAMING METER DATA

RELATED APPLICATION

This patent claims the benefit of U.S. Provisional Patent Application No. 63/295,414, which was filed on Dec. 30, 2021. U.S. Provisional Patent Application No. 63/295,414 is hereby incorporated herein by reference in its entirety. Priority to U.S. Provisional Patent Application No. 63/295,414 is hereby claimed.

FIELD OF THE DISCLOSURE

This disclosure relates generally to media monitoring and, more particularly, to methods and apparatus for dynamic media insertion based on streaming meter data.

BACKGROUND

In recent years, entities such as advertisers have utilized targeted advertising to direct Internet-based advertisements to consumers with specific characteristics. Such targeted advertising can increase the effectiveness of advertisements by preventing advertisements from being presented to consumers that are not likely to purchase the advertised product.

Figure 1:
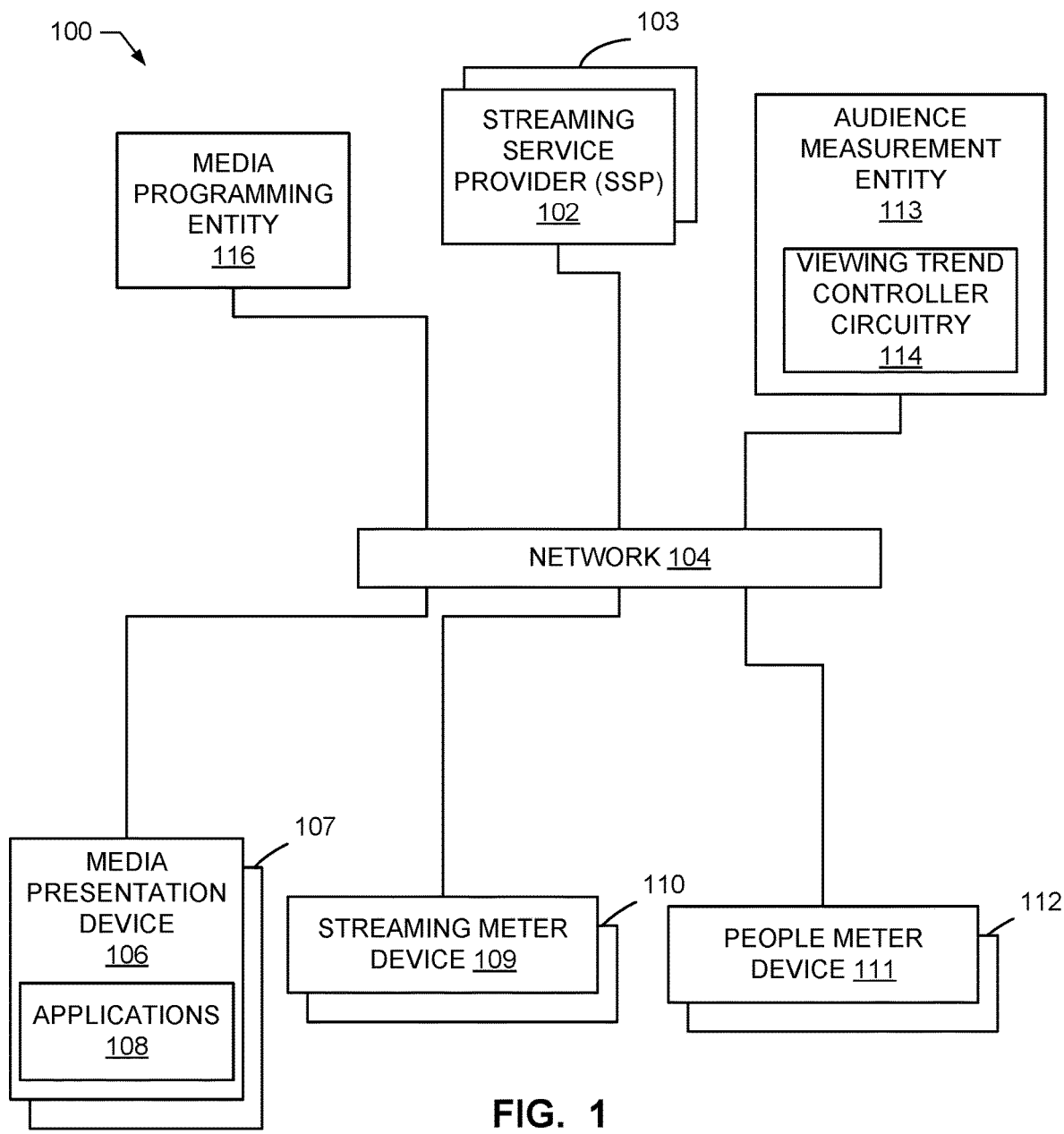
FIG. 1 illustrates an example environment that includes example viewing trend controller circuitry.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to events that occur five minutes or less apart.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Audience measurement entities (AMEs), also referred to herein as "ratings entities," determine demographic reach for advertising and media programming based on registered panel members. That is, an audience measurement entity enrolls people that consent to being monitored into a panel. During enrollment, the audience measurement entity receives demographic information from the enrolling panelists so that subsequent correlations may be made between advertisement/media exposure to those panelists and different demographic markets.

Media programming entities, streaming service providers (SSPs), and/or other entities can use audience measurement data to improve their operations. By way of example, a media programming entity (e.g., advertiser) may want to dynamically choose a media platform from a variety of available over-the-top (OTT) sources, such as SSPs or other media platforms, for broadcasting its commercials. In this example, the media programming entity may be interested in getting audience composition data and/or other panelist information from the AME to decide when and/or where (e.g., which media platform) to broadcast a particular commercial.

Example methods and apparatus disclosed herein facilitate monitoring and generation of viewing trend indicators based on streaming meter data collected from a plurality of metering devices. For example, a viewing trend indicator is updated in substantially real time to indicate a current viewing trend associated with a particular media presentation application, SSP, device model, age group, media genre, and/or any other audience or device metric. Thus, for example, the viewing trend indicator can be used to selectively broadcast and/or dynamically insert media content (e.g., advertisements, etc.) into streaming sessions of a particular SSP at a particular time based on a variety of substantially real-time metrics measured, compiled, and/or computed by the AME.

FIG. 1 is a block diagram of an example environment 100 in which examples disclosed herein can be implemented. The example environment 100 includes a plurality of streaming service providers (SSP) 102, 103, a plurality of media presentation devices 106, 107, a plurality of streaming meter devices 109, 110, a plurality of people meter devices 111, 112, an audience measurement entity (AME) 113 including viewing trend controller circuitry 114, and a media programming entity 116 all connected via a network 104.

The example SSPs 102, 103 distribute media content (e.g., television programming, movies, advertisements, live sports, on-demand content, live content, user-generated content, etc.) to subscribers via the network 104. The media content is presented to the subscribers via the media presentation devices 106, 107. Examples of the media presentation devices 106, 107 include smart TVs, personal computers, tablet devices, cellular phones, set top boxes, hardware digital media players connected to a display, or any other device which can receive media content from the SSPs 102, 103 via the network 104 for presentation to the subscribers. The example media presentation device 106 of FIG. 1 includes applications 108. The applications 108 can correspond to the SSP 102, 103. For example, the subscriber of an SSP 102 can select one of the applications 108 of the media presentation device 106 corresponding to the SSP 102 in order to view media content distributed by the SSP 102.

The example streaming meter devices 109, 110 monitor streaming media output by the example media presentation device 106. For example, the example streaming meter device 109 is in communication with the example media presentation device 106 to collect streaming meter data corresponding to streaming media output by the media presentation device 106. The streaming meter device 109 may be coupled with the media presentation device 106 via wired and/or wireless connection. The streaming meter device 109 may be a portable people meter, a cell phone, a computing device, a sensor, and/or any other device capable of metering (e.g., monitoring) user exposure to media.

The example streaming meter device 109 can collect streaming meter data when a user (e.g., a panelist, a subscriber, etc.) streams media content on the media presentation device 106. For example, a subscriber of the SSP 102 can select the application 108 on the media presentation device 106 corresponding to the SSP 102 and streams media content from the SSP 102. The streaming of the media content from the SSP 102 at the media presentation device 106 is monitored by the streaming meter device 109 and the streaming meter device 109 collects the streaming meter data. The streaming meter data can include a timestamp of the streaming media content, a duration of the streaming media content, information corresponding to the media presentation device 106 (e.g., a model or device type, a location, a name, an identification or serial number, a mac address, an IP address, a server, etc.), and/or the application 108 used to stream the media content. Example streaming metering data is shown below. The example streaming meter devices 109, 110 can transmit the streaming meter data to the AME 113 in substantially real time (e.g., every minute, every 5 minutes, etc.).

An example Device Discovery Event may be formatted as: <DeviceDiscoveryEvent sequence="11354" timestamp="2021-12-25T20:17:42Z" macAddress="00:11:D9:F8:E5:9F" startTime="2021-12-25T20:12:36Z" duration="306" count="0"><uuid>411fe22-7645-4ac5-85d7-5ddb7804c628</uuid><location>http://192.168.1.82:51427/dd.xml</location><server>Linux/2.6 UPnP/1.0 quick_ssdp/1.0</server><type>urn:schemas-upnp-org:device:tvdevice: 1</type><name>Bedroom</ name><model>TiVo_TCD746320</model><activeApp>Netflix</activeApp></DeviceDiscoveryEvent>

The example people meter devices 111, 112 monitor panelists exposure to media output by the example media presentation device 106. For example, the example people meter device 111 is in communication with the example media presentation device 106 to collect and/or capture signals emitted externally by the media presentation device 106. The people meter device 112 may be coupled with the media presentation device 106 via wired and/or wireless connection. The people meter device 111 may be a portable people meter, a cell phone, a computing device, a sensor, and/or any other device capable of metering (e.g., monitoring) user exposure to media. In such examples, the people meter device 111 may be used to monitor media exposure for multiple users and/or media presentation devices 106.

In some examples, the example people meter device 111 of FIG. 1 includes a set of buttons assigned to audience members to determine which of the audience members is watching the example media presentation device 106. The people meter device 111 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the people meter device 111 prompts only after the people meter device 111 detects a channel change and/or a change in state of the media presentation device 106. In some examples, the people meter device 111 may additionally or alternatively include at least one sensor (e.g., a camera, 3-dimensional sensor, etc.) and/or be communicatively coupled to at least one sensor that detects a presence of the user at the media presentation device 106. The example people meter device 111 transmits the people meter data to the AME 113. The example people meter devices 111, 112 can transmit the people meter data to the AME 113 in substantially real time (e.g., every minute, every 5 minutes, etc.). The people meter data can include the media presentation data (e.g., data related to media presented while the media presentation device 106 is on and a user is present) and/or the audience data (e.g., data related to which audience member is present for the media presentation).

The example AME 113 stores and processes the streaming meter data and the people meter data transferred from the streaming meter devices 109, 110 and the people meter devices 111, 112. The example AME 113 can be, in some examples, a media monitoring company. Media monitoring companies desire knowledge on how users interact with media devices such as smartphones, tablets, laptops, smart televisions, etc. In particular, media monitoring companies want to monitor media accessed by the media devices to, among other things, monitor exposure to advertisements, determine advertisement effectiveness, determine user behavior, identify purchasing behavior associates with various demographics, etc. Data transferred to the AME 113 may be edited and may also be deleted or stored after it is used. For clarity, example FIG. 1 shows two media presentation devices 106, 107, two streaming meter devices 109, 110 and two people meter devices 111, 112 connected to the AME 113. This represents that at any given time multiple example media presentation devices and meter devices may be interacting. In addition, any quantity of example devices may be communicating with the AME 113 over the network 104.

The example AME 113 includes viewing trend controller circuitry 114. The example viewing trend controller circuitry 114 receives and processes the streaming meter data and the people meter data from an AME server of the AME 113. In some examples, the streaming meter data and/or the people meter data is modified by the AME server of the AME 113 before being transferred to the viewing trend controller circuitry 114. In other examples, the meter data is combined with additional data by the AME server of the AME 113. Data can be provided to the viewing trend controller circuitry 114, for example, at regular intervals or upon request.

The example viewing trend controller circuitry 114 uses the streaming meter data and/or the people meter data to create and/or update one or more viewing trend indicators. The one or more viewing trend indicators indicate viewing trends of streaming media content at the media presentation devices 106, 107. The viewing trend indicators can be generated and/or updated substantially in real time (e.g., every minute, every 5 minutes, etc.). In some examples, the viewing trend controller circuity 114 uses the streaming meter data to generate and/or update the viewing trend indicators based on 1) or 2). In other examples, the viewing trend controller circuitry 114 uses the streaming meter data in conjunction with the people meter data to generate and/or update the viewing trend indicators based on 3).

The example media programming entity 116 provides media content for distribution to consumers. In some examples, the media programming entity 116 provides the media content to the SSPs 102, 103 for the SSPs 102, 103 to distribute the media content to the subscribers of the SSPs 102, 103. The media content can include television shows, movies, news programming, live sports, and/or advertisements. In some examples, the media programming entity 116 provides advertisements. In other examples, the media programming entity 116 receives advertisements from third-party advertisers. In either example, the media programming entity 116 or the third-party advertisers select advertisements for distribution. In some examples, the advertisements are selected based on an accompanying media program (e.g., television show, movie, news programming, live sports program, etc.). For example, if a media program has a high viewership, an advertisement may be selected to accompany the media program in order to gain higher visibility of the advertisement. In another example, if a media program is typically watched by a particular demographic of consumers, an advertisement may be selected to accompany the media program in order to target the advertisement to the particular demographic. In some examples, an advertisement is selected based on a combination of viewership and demographics. The example media programming entity 116 can receive the viewing trend indicators from the viewing trend controller circuitry 114. The example media programming entity 116 and/or the third-party advertisers can select advertisements based on the viewing trend indicators. Because the viewing trend indicators are generated and/or updated in substantially real time, the example media programming entity 116 and/or the third-party advertisers can select the advertisements to provide to the SSPs 102, 103 based on the viewing trend indicators in substantially real time.

Figure 2:
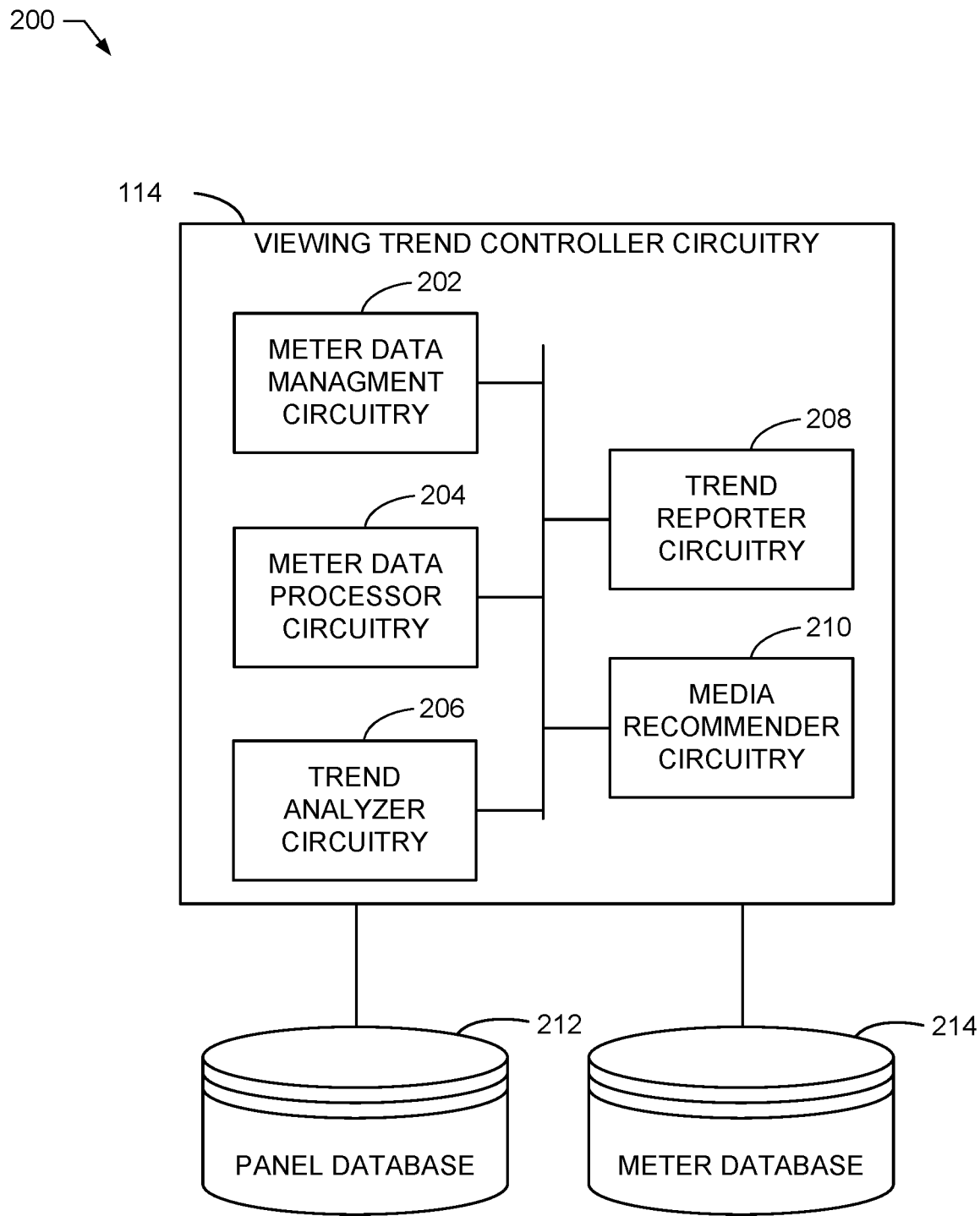
FIG. 2 is a block diagram of example viewing trend controller circuitry constructed in accordance with teachings of this disclosure to implement the example viewing trend controller circuitry of FIG. 1.

FIG. 2 is a block diagram of viewing trend controller circuitry 114 to dynamically insert media based on streaming meter data. The viewing trend controller circuitry 114 of FIG. 2 may be instantiated (e.g., creating an instance of, bring into being for any length of time, materialize, implement, etc.) by processor circuitry such as a central processing unit executing instructions. Additionally or alternatively, the viewing trend controller circuitry 114 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example viewing trend controller circuitry 114 includes meter data management circuitry 202. The example meter data management circuitry 202 obtains meter data (e.g., streaming meter data, people meter data) from meter devices (e.g., the streaming meter devices 109, 110 of FIG. 1, the people meter devices 111, 112 of FIG. 1). The streaming meter data can include a timestamp of streaming media content, a duration of the streaming media content, a start time of streaming the media content, information corresponding to the media presentation device 106 (e.g., a model or device type, a location, a name, an identification or serial number, a mac address, an IP address, a server, etc.), and/or the application 108 used to stream the media content. The people meter data can include the media presentation data (e.g., data related to media presented while the media presentation device 106 is on and a user is present) and/or audience data (e.g., data related to which audience member is present for the media presentation). The example meter data management circuitry 202 can obtain the meter data periodically, aperiodically, or upon request. In examples disclosed herein, the meter data management circuitry 202 obtains the meter data substantially in real time (e.g., every minute, every 5 minutes, etc.).

The example viewing trend controller circuitry 114 is communicatively connected to a panel database 212 and a meter database 214. The example panel database 212 contains information (e.g., demographic information) related to the panelists of the AME 113. The example meter data management circuitry 202 can compare audience data included in people meter data to the panel database 212 to determine demographics (e.g., age, gender, location, etc.) of the audience of the media presentation. In some examples, both streaming meter data and people meter data are obtained for the same media presentation. In these examples, the meter data management circuitry 202 can link the streaming meter data and the people meter data for the media presentation. Therefore, in these examples, demographics of the audience of the media presentation are known.

The example meter data management circuitry 202 can store the meter data (e.g., the streaming meter data, the people meter data) in a meter database 214. For example, each time the meter data management circuitry 202 obtains new meter data, the meter data management circuitry 202 adds the new meter data to the meter database 214. In some examples, the meter data management circuitry 202 is instantiated by processor circuitry executing meter data management instructions and/or configured to perform operations such as those represented by the flowcharts of FIGS. 3 and/or 4.

The example viewing trend controller circuitry 114 includes meter data processor circuitry 204. The example meter data processor circuitry 204 performs processing operations on the meter data (e.g., the streaming meter data and/or the people meter data). The example meter data processor circuitry 204 can identify active streaming sessions of an SSP (e.g., the SSP 102 of FIG. 1). In order to identify active streaming sessions, the meter data processor circuitry 204 can analyze the streaming meter data (e.g., the timestamp, the duration, and/or the start time) to identify streaming meter data corresponding to streaming media presentations active at a given time (e.g., the current time, the time of analysis, etc.). For example, the meter data processor circuitry 204 can add the duration to the start time of the streaming meter data and compare to the current time. If the sum of the duration and the start time is within a threshold (e.g., 5 minutes) of the current time, the media data processor circuitry 204 can identify the streaming meter data as corresponding to an active streaming session. The example meter data processor circuitry 204 can analyze each available streaming meter data in such a way to determine active streaming sessions.

Each of the active streaming sessions corresponds to streaming meter data including information corresponding to the media presentation device 106 (e.g., a model or device type, a location, a name, an identification or serial number, a mac address, an IP address, a server, etc.), and/or the application 108 used to stream the media content. The example meter data processor circuitry 204 can filter the active streaming sessions. For example, the meter data processor circuitry 204 can filter the active streaming sessions based on the streaming meter data such as the device type of the media presentation device 106 or the application 108 used to stream the media content. As explained above, in some examples, the streaming meter data is linked to people meter data such that the demographics of the audience corresponding to the streaming meter data is known. In these examples, the meter data processor circuitry 204 can filter the active streaming sessions based on the people meter data. For example, the meter data processor circuitry 204 can filter the active streaming sessions based on an age group of the audience. After the active streaming sessions are filtered, the example meter data processor circuitry 204 can perform one or more operations on the filtered active streaming sessions. For example, the meter data processor circuitry 204 can sum the viewing durations of the filtered active streaming sessions. In some examples, the meter data processor circuitry 204 is instantiated by processor circuitry executing meter data processing instructions and/or configured to perform operations such as those represented by the flowcharts of FIGS. 3 and/or 4.

The example viewing trend controller circuitry 114 includes trend analyzer circuitry 206. The example trend analyzer circuitry 206 can select criteria for analysis of viewing trends. For example, each viewing trend indicator can correspond to one or more criteria such as a device type, an application, an audience demographic, or any other criteria related to the streaming meter data and/or the people meter data. The example trend analyzer circuitry 206 can select one or more of the criteria corresponding to a viewing trend indicator. The one or more criteria can be used by the example meter data processor circuitry 204 for filtering of the active streaming sessions. The filtered active streaming sessions corresponding to the criteria selected by the trend analyzer circuitry 206 can be used to generate and/or update the corresponding viewing trend indicator. For example, the trend analyzer circuitry 206 can select an example device type and the meter data processor circuitry 204 can filter the active streaming sessions to include only those corresponding to the example device type. The example trend analyzer circuitry 206 can then generate and/or update a viewing trend indicator corresponding to the example device type based on the filtered active streaming sessions.

The example trend analyzer circuitry 206 generates and/or updates viewing trend indicators. For example, if, for a given set of criteria, a viewing trend indicator exists, the trend analyzer circuitry 206 updates the viewing trend indicator based on the filtered active streaming sessions. If, for a given set of criteria, the viewing trend indicator does not exist, the trend analyzer circuitry 206 generates a viewing trend indicator corresponding to the criteria. In a subsequent iteration, the trend analyzer circuitry 206 can update the viewing trend indicator. The example trend analyzer circuitry 206 generates and/or updates the viewing trend indicators based on the filtered active streaming sessions. For example, based on the sum of the durations of the filtered active streaming sessions determined by the meter data processor circuitry 204, the trend analyzer circuitry 206 can generate a value for the viewing trend indicator. For example, the value can be equal to the sum of the durations, the value can be proportionate to the sum of the durations, or the value can be based on the sum of the durations using any other mathematical calculation. For each criteria and/or viewing trend indicator, the example trend analyzer circuitry 206 can generate and/or update the viewing trend indicator. For example, once a viewing trend indicator for a first criteria is updated, the trend analyzer circuitry 206 can update a viewing trend indicator for a second criteria. In some examples, the trend analyzer circuitry 206 is instantiated by processor circuitry executing trend analyzer instructions and/or configured to perform operations such as those represented by the flowcharts of FIGS. 3 and/or 4.

The example viewing trend controller circuitry 114 includes trend reporter circuitry 208. The example trend reporter circuitry 208 can report one or more viewing trend indicators to one or more entities. For example, the trend reporter circuitry 208 can report the one or more viewing trend indicators to the media programming entity 116 of FIG. 1. The example trend reporter circuitry 208 can report the one or more viewing trend indicators periodically, aperiodically, or upon request. In some examples, the trend reporter circuitry 208 reports the one or more viewing trend indicators in substantially real time (e.g., every minute, every 5 minutes). The example trend reporter circuitry 208 can report each one of the one or more viewing trend indicators following an update of the viewing trend indicator by the trend analyzer circuitry 206. In some examples, the trend reporter circuitry 208 is instantiated by processor circuitry executing trend reporter instructions and/or configured to perform operations such as those represented by the flowcharts of FIGS. 3 and/or 4.

The example viewing trend controller circuitry 114 includes media recommender circuitry 210. The example media recommender circuitry 210 controls media insertion based on the viewing trend indicator. For example, the media recommender circuitry 210 can select media (e.g., an advertisement) for presentation to a user. The media recommender circuitry 210 can select the media based on the one or more viewing trend indicators. In some examples, the media recommender circuitry 210 selects the media based on demographics of the user. The example media recommender circuitry 210 can recommend the media for presentation to the user to an entity (e.g., the media programming entity 116, the SSP 102, etc.). In some examples, the media recommender circuitry 210 is instantiated by processor circuitry executing media recommender instructions and/or configured to perform operations such as those represented by the flowcharts of FIGS. 3 and/or 4.

In some examples, the apparatus includes means for obtaining meter data. For example, the means for obtaining meter data may be implemented by the meter data management circuitry 202. In some examples, the meter data management circuitry 202 may be instantiated by processor circuitry such as the example processor circuitry 512 of FIG. 5. For instance, the meter data management circuitry 202 may be instantiated by the example microprocessor 600 of FIG. 6 executing machine executable instructions such as those implemented by at least blocks 302, 308 of FIG. 3. In some examples, the meter data management circuitry 202 may be instantiated by hardware logic circuitry, which may be implemented by an ASIC, XPU, or the FPGA circuitry 700 of FIG. 7 structured to perform operations corresponding to the machine readable instructions. Additionally or alternatively, the meter data management circuitry 202 may be instantiated by any other combination of hardware, software, and/or firmware. For example, the meter data management circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying active streaming sessions. For example, the means for identifying active streaming sessions may be implemented by the meter data processor circuitry 204. In some examples, the meter data processor circuitry 204 may be instantiated by processor circuitry such as the example processor circuitry 512 of FIG. 5. For instance, the meter data processor circuitry 204 may be instantiated by the example microprocessor 600 of FIG. 6 executing machine executable instructions such as those implemented by at least blocks 304 of FIG. 3. In some examples, the meter data processor circuitry 204 may be instantiated by hardware logic circuitry, which may be implemented by an ASIC, XPU, or the FPGA circuitry 700 of FIG. 7 structured to perform operations corresponding to the machine readable instructions. Additionally or alternatively, the meter data processor circuitry 204 may be instantiated by any other combination of hardware, software, and/or firmware. For example, the meter data processor circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating a viewing trend indicator. For example, the means for generating a viewing trend indicator may be implemented by the trend analyzer circuitry 206. In some examples, the trend analyzer circuitry 206 may be instantiated by processor circuitry such as the example processor circuitry 512 of FIG. 5. For instance, the trend analyzer circuitry 206 may be instantiated by the example microprocessor 600 of FIG. 6 executing machine executable instructions such as those implemented by at least blocks 306 of FIG. 3 and 412 of FIG. 4. In some examples, the trend analyzer circuitry 206 may be instantiated by hardware logic circuitry, which may be implemented by an ASIC, XPU, or the FPGA circuitry 700 of FIG. 7 structured to perform operations corresponding to the machine readable instructions. Additionally or alternatively, the trend analyzer circuitry 206 may be instantiated by any other combination of hardware, software, and/or firmware. For example, the trend analyzer circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for transmitting a viewing trend indicator. For example, the means for transmitting a viewing trend indicator may be implemented by the trend reporter circuitry 208. In some examples, the trend reporter circuitry 208 may be instantiated by processor circuitry such as the example processor circuitry 512 of FIG. 5. For instance, the trend reporter circuitry 208 may be instantiated by the example microprocessor 600 of FIG. 6 executing machine executable instructions such as those implemented by at least blocks 310 of FIG. 3. In some examples, the trend reporter circuitry 208 may be instantiated by hardware logic circuitry, which may be implemented by an ASIC, XPU, or the FPGA circuitry 700 of FIG. 7 structured to perform operations corresponding to the machine readable instructions. Additionally or alternatively, the trend reporter circuitry 208 may be instantiated by any other combination of hardware, software, and/or firmware. For example, the trend reporter circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for filtering active streaming sessions. For example, the means for filtering active streaming sessions may be implemented by the meter data processor circuitry 204. In some examples, the meter data processor circuitry 204 may be instantiated by processor circuitry such as the example processor circuitry 512 of FIG. 5. For instance, the meter data management circuitry 202 may be instantiated by the example microprocessor 600 of FIG. 6 executing machine executable instructions such as those implemented by at least blocks 404 of FIG. 4. In some examples, the meter data processor circuitry 204 may be instantiated by hardware logic circuitry, which may be implemented by an ASIC, XPU, or the FPGA circuitry 700 of FIG. 7 structured to perform operations corresponding to the machine readable instructions. Additionally or alternatively, the meter data management processor 204 may be instantiated by any other combination of hardware, software, and/or firmware. For example, the meter data processor circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for updating a viewing trend indicator. For example, the means for updating a viewing trend indicator may be implemented by the trend analyzer circuitry 206. In some examples, the trend analyzer circuitry 206 may be instantiated by processor circuitry such as the example processor circuitry 512 of FIG. 5. For instance, the trend analyzer circuitry 206 may be instantiated by the example microprocessor 600 of FIG. 6 executing machine executable instructions such as those implemented by at least blocks 306 of FIG. 3 and 410 of FIG. 4. In some examples, the trend analyzer circuitry 206 may be instantiated by hardware logic circuitry, which may be implemented by an ASIC, XPU, or the FPGA circuitry 700 of FIG. 7 structured to perform operations corresponding to the machine readable instructions. Additionally or alternatively, the trend analyzer circuitry 206 may be instantiated by any other combination of hardware, software, and/or firmware. For example, the trend analyzer circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for controlling media insertion. For example, the means for controlling media insertion may be implemented by the media recommender circuitry 210. In some examples, the media recommender circuitry 210 may be instantiated by processor circuitry such as the example processor circuitry 512 of FIG. 5. For instance, media recommender circuitry 210 may be instantiated by the example microprocessor 600 of FIG. 6 executing machine executable instructions such as those implemented by at least blocks 312 of FIG. 3. In some examples, the media recommender circuitry 210 may be instantiated by hardware logic circuitry, which may be implemented by an ASIC, XPU, or the FPGA circuitry 700 of FIG. 7 structured to perform operations corresponding to the machine readable instructions. Additionally or alternatively, the media recommender circuitry 210 may be instantiated by any other combination of hardware, software, and/or firmware. For example, the media recommender circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the viewing trend controller circuitry 114 of FIG. 1 is illustrated in FIG. 2, one or more of the elements, processes, and/or devices illustrated in FIG. 2 may be combined, divided, re-arranged, omitted, eliminated, and/or implemented in any other way. Further, the example meter data management circuitry 202, the example meter data processor circuitry 204, the example trend analyzer circuitry 206, the example trend reporter circuitry 208, the example media recommender circuitry 210, and/or, more generally, the example viewing trend controller circuitry 114 of FIG. 1, may be implemented by hardware alone or by hardware in combination with software and/or firmware. Thus, for example, any of the example meter data management circuitry 202, the example meter data processor circuitry 204, the example trend analyzer circuitry 206, the example trend reporter circuitry 208, the example media recommender circuitry 210, and/or, more generally, the example viewing trend controller circuitry 114, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC (s)), programmable logic device(s) (PLD(s)), and/or field programmable logic device(s) (FPLD(s)) such as Field Programmable Gate Arrays (FPGAs). Further still, the example viewing trend controller circuitry 114 of FIG. 1 may include one or more elements, processes, and/or devices in addition to, or instead of, those illustrated in FIG. 2, and/or may include more than one of any or all of the illustrated elements, processes and devices.

Figure 3:
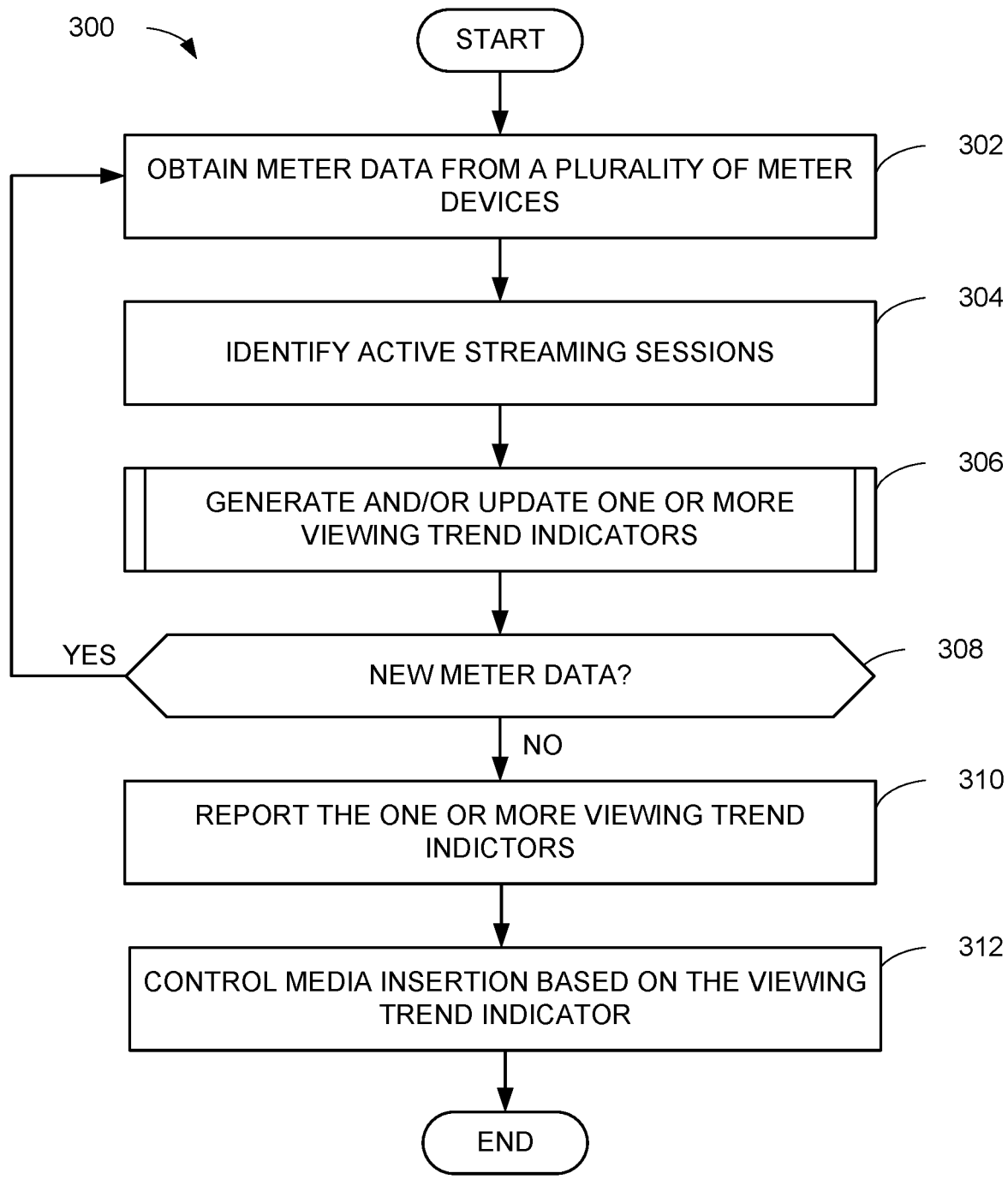
FIGS. 3-4 are flowcharts representative of example machine readable instructions and/or example operations that may be executed by example processor circuitry to implement the viewing trend controller circuitry of FIG. 2.
Figure 4:
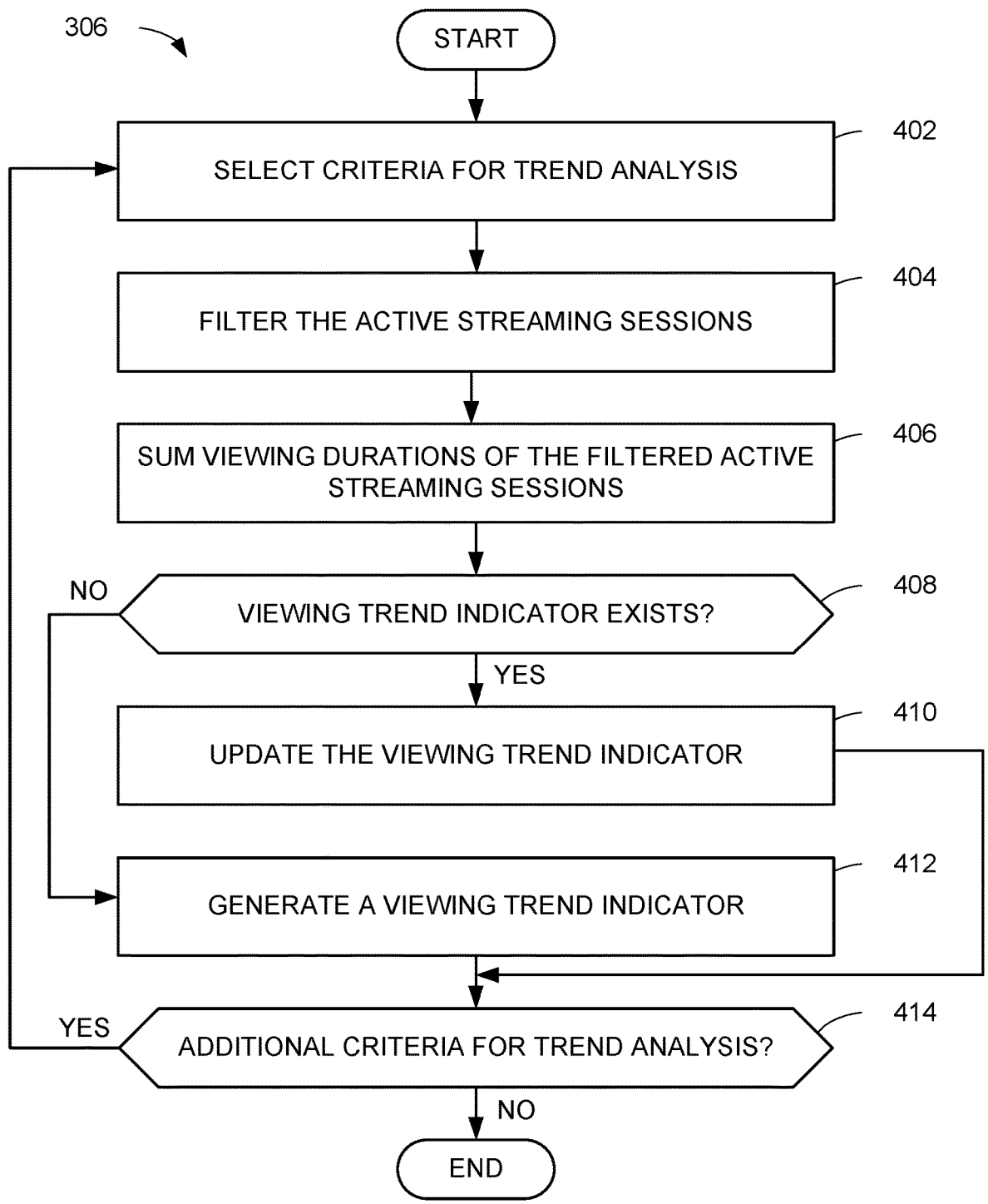

A flowchart representative of example hardware logic circuitry, machine readable instructions, hardware implemented state machines, and/or any combination thereof for implementing the viewing trend controller circuitry 114 of FIG. 2 is shown in FIGS. 3-4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3-4, many other methods of implementing the example viewing trend controller circuitry 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to dynamically insert media based on streaming meter data. The machine readable instructions and/or the operations 300 of FIG. 3 begin at block 302, at which the example meter data management circuitry 202 obtains meter data from a plurality of meter devices. For example, the meter data management circuitry 202 obtains streaming meter data from one or more streaming meter devices (e.g., the streaming meter devices 109, 110 of FIG. 1). In some examples, the meter data management circuitry additionally or alternatively obtains people meter data from one or more people meter devices (e.g., the people meter devices 111, 112 of FIG. 1).

At block 304, the example meter data processor circuitry 204 identifies active streaming sessions. In some examples, the meter data processor circuitry 204 identifies active streaming sessions corresponding to an example SSP (e.g., the SSP 102 of FIG. 1). For example, the meter data processor circuitry 204 analyzes the timestamp information included in the streaming meter data and/or the people meter data to identify streaming sessions active at a given time. At block 306, the example viewing trend controller circuitry 114 generates and/or updates one or more viewing trend indicators. Example instructions that may be used to implement the operations of block 306 are discussed below in connection with FIG. 4. As a result of the operations of block 306, the example viewing trend controller circuitry 114 the viewing trend indicator is generated and/or updated.

At block 308, the example meter data management circuitry 202 checks if new meter data is available. For example, the meter data management circuitry 202 checks if additional streaming meter data is available from one or more streaming meter devices and/or if additional people meter data is available from one or more people meter devices. If new meter data is available (block 308: YES), the process returns to block 302. If new meter data is not available (block 308: NO), the process continues to block 310. At block 310, the example trend reporter circuitry 208 reports the viewing trend indicator. For example, the trend reporter circuitry 208 can transmit one or more of the viewing trend indicators to an entity (e.g., the media programming entity 116 of FIG. 1) via a network (e.g., the network 104 of FIG. 1). At block 312, the example media recommender circuitry 210 controls media insertion based on one or more of the viewing trend indicators. For example, the media recommender circuitry 210 can select media for presentation to a user based on one or more of the viewing trend indicators and demographics of the user and the media recommender circuitry 210 can recommend the media for presentation to the user to an entity. The process of FIG. 3 ends.

FIG. 4 is a flowchart representative of example machine readable instructions and/or example operations 306 that may be executed and/or instantiated by processor circuitry to generate and/or update a viewing trend indicator. The machine readable instructions and/or the operations 300 of FIG. 4 begin at block 402, at which the example trend analyzer circuitry 206 selects criteria for trend analysis. For example, the trend analyzer circuitry 206 can select criteria including a device type and an application. In another example, the trend analyzer circuitry 206 selects criteria including a device type. In another example, the trend analyzer circuitry 206 selects criteria including an application and an age group. In other examples, the trend analyzer circuitry 206 can select criteria including any other combination of information included in the streaming meter data and/or the people meter data. At block 404, the example meter data processor circuitry 204 filters the active streaming sessions. For example, the meter data processor circuitry 204 can filter the active streaming sessions based on the criteria selected by the trend analyzer circuitry 206 at block 402. At block 406, the example meter data processor circuitry 204 sums viewing durations of the filtered active streaming sessions. For example, the meter data processor circuitry 204 can determine a viewing duration for each of the filtered active streaming sessions and perform an operation to determine a summation of the viewing durations of the filtered active streaming sessions.

At block 408, the example trend analyzer circuitry 206 checks if a viewing trend indicator exists. For example, the trend analyzer circuitry 206 checks if a viewing trend indicator corresponding to the criteria selected at block 402 exists. If a viewing trend indicator corresponding to the criteria exists (block 408: YES), the process continues at block 410. If a viewing trend indicator corresponding to the criteria does not exist (block 408: NO), the process continues at block 412. At block 410, the example trend analyzer circuitry 206 updates the viewing trend indicator. For example, the trend analyzer circuitry 206 updates a value of the viewing trend indicator for the criteria based on the sum of the viewing durations determined at block 406. At block 412, the example trend analyzer circuitry 206 generates a viewing trend indicator. For example, the trend analyzer circuitry 206 initializes a viewing trend indicator corresponding to the criteria and determines an initial value of the viewing trend indicator. At block 414, the example trend analyzer circuitry 206 determines if additional criteria for trend analysis are available. If additional criteria for trend analysis are available (block 412: YES), the process returns to block 402. If additional criteria for trend analysis are not available (block 410: NO), the process of FIG. 4 ends.

Figure 5:
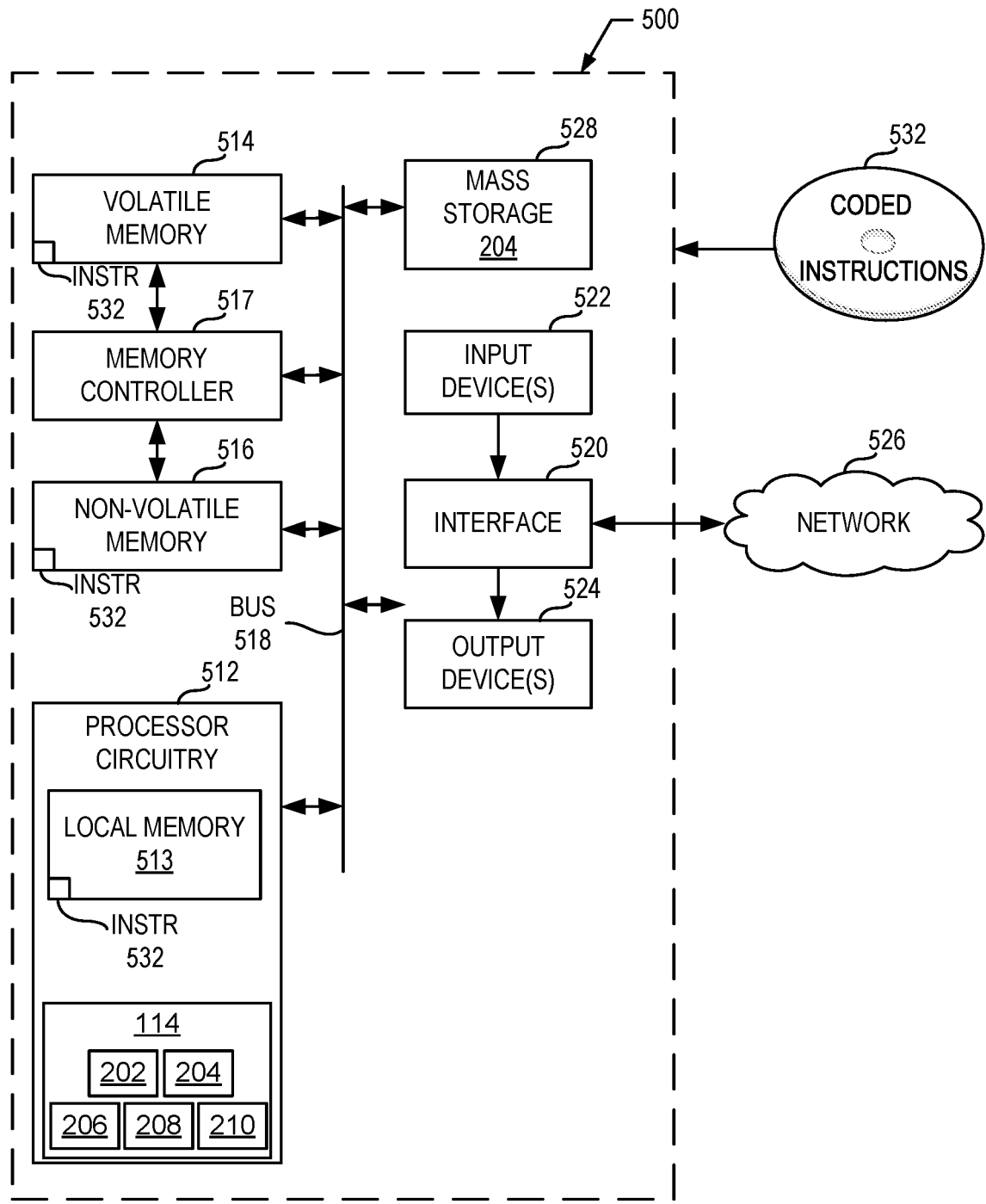
FIG. 5 is a block diagram of an example processing platform including processor circuitry structured to execute the example machine readable instructions and/or the example operations of FIGS. 3-4 to implement the viewing trend controller circuitry of FIG. 2.

FIG. 5 is a block diagram of an example processor platform 500 structured to execute and/or instantiate the machine readable instructions and/or the operations of FIGS. 3-4 to implement the viewing trend controller circuitry 114 of FIG. 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the viewing trend controller circuitry 114, the meter data management circuitry 202, the meter data processor circuitry 204, the trend analyzer circuitry 206, the trend reporter circuitry 208, and the media recommender circuitry 210.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 532, which may be implemented by the machine readable instructions of FIGS. 3-4, may be stored in the mass storage device 528, in the volatile memory 514, in the non-volatile memory 516, and/or on a removable non-transitory computer readable storage medium such as a CD or DVD.

Figure 6:
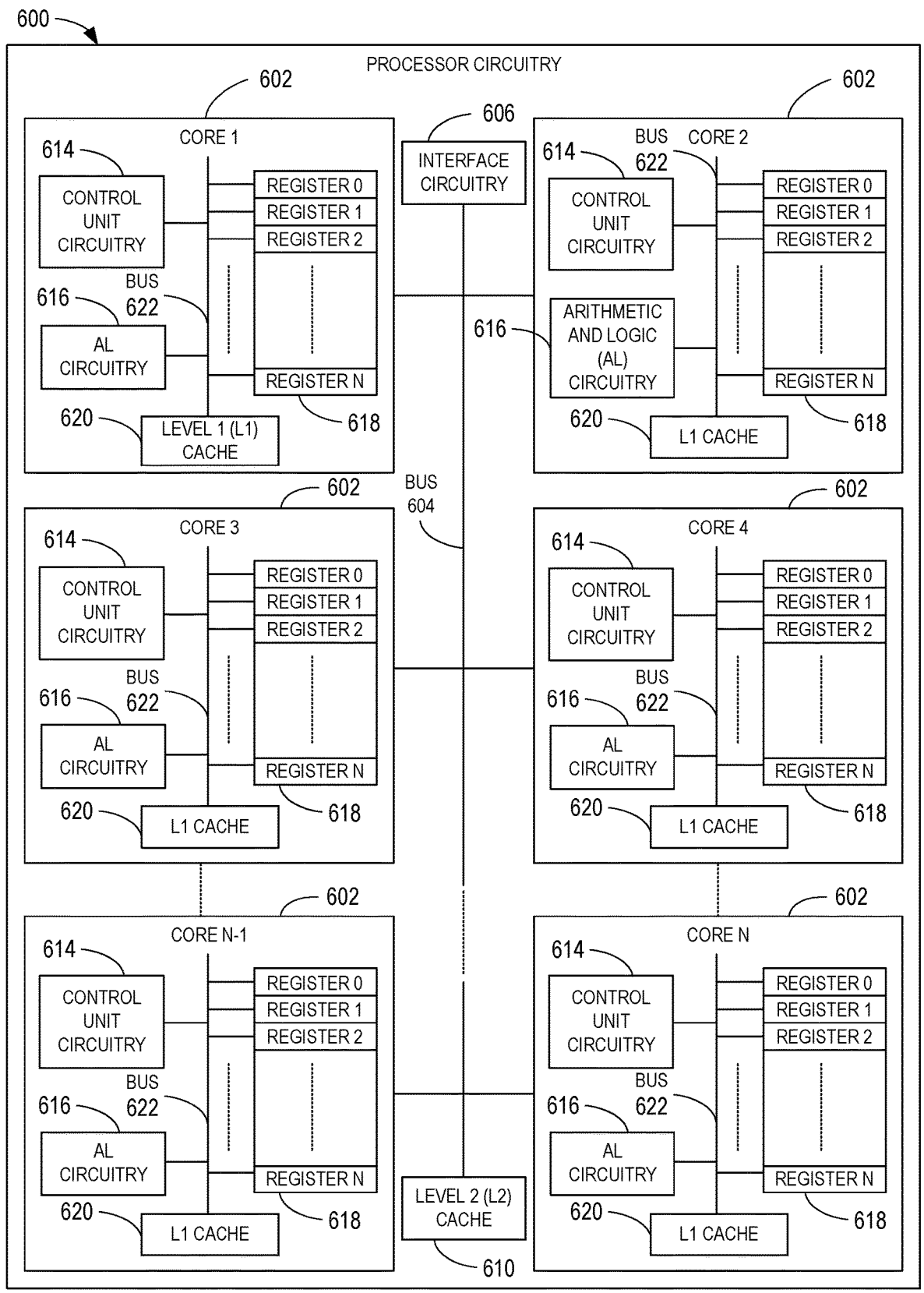
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowcharts of FIGS. 3-4 to effectively instantiate the circuitry of FIG. 2 as logic circuits to perform the operations corresponding to those machine readable instructions. In some such examples, the circuitry of FIG. 2 is instantiated by the hardware circuits of the microprocessor 600 in combination with the instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3-4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may be implemented by at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
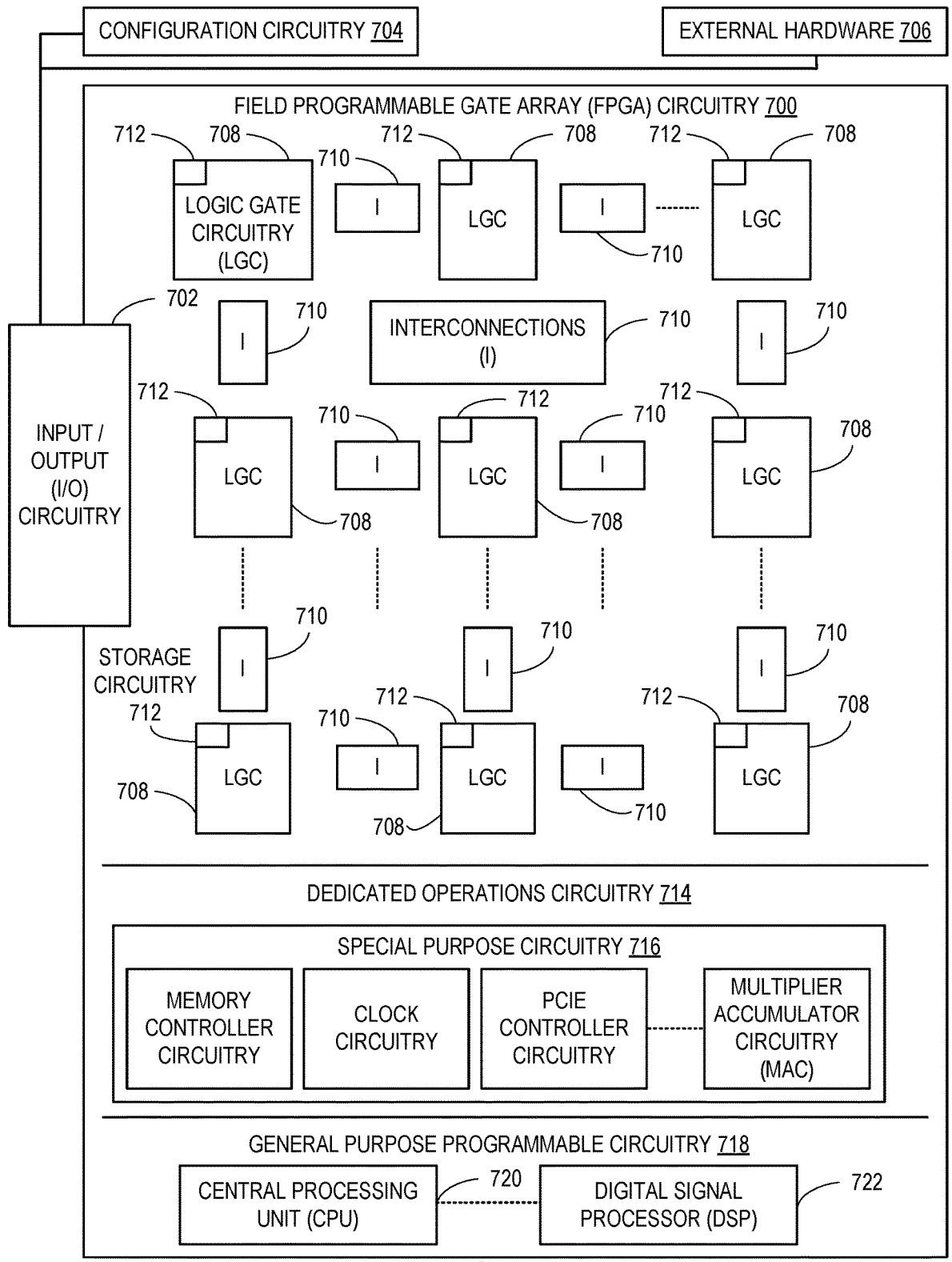
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowcharts of FIGS. 3-4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts of FIGS. 3-4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowcharts of FIGS. 3-4. As such, the FPGA circuitry 700 may be structured to effectively instantiate some or all of the machine readable instructions of the flowcharts of FIGS. 3-4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIGS. 3-4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 600 of FIG. 6. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIGS. 3-4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowcharts of FIGS. 3-4 may be executed by one or more of the cores 602 of FIG. 6, a second portion of the machine readable instructions represented by the flowcharts of FIGS. 3-4 may be executed by the FPGA circuitry 700 of FIG. 7, and/or a third portion of the machine readable instructions represented by the flowcharts of FIGS. 3-4 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
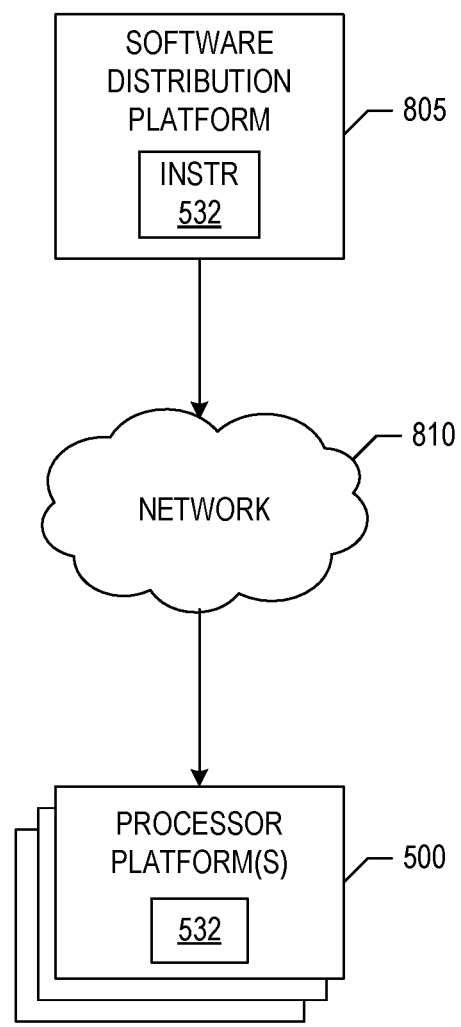
FIG. 8 is a block diagram of an example software distribution platform (e.g., one or more servers) to distribute software (e.g., software corresponding to the example machine readable instructions of FIGS. 3-4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 300, 306 of FIGS. 3-4, as described above. The one or more servers of the example software distribution platform 805 are in communication with an example network 810, which may correspond to any one or more of the Internet and/or any of the example networks 104 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 300, 306 of FIGS. 3-4, may be downloaded to the example processor platform 500, which is to execute the machine readable instructions 532 to implement the viewing trend analyzer circuitry 114. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that provide for dynamic media insertion based on streaming meter data. Disclosed systems, methods, apparatus, and articles of manufacture improve the efficiency of using a computing device by improving a quality and a relevancy of viewing trend indicators by determining the viewing trend indicators substantially in real time. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for dynamic media insertion based on streaming meter data are disclosed herein. Further examples and combinations thereof include the following:

Example 1 includes an apparatus comprising meter data management circuitry to obtain, via a network, streaming meter data from a plurality of streaming meter devices, the streaming meter data including streaming sessions detected by the plurality of metering devices, meter data processor circuitry to identify active streaming sessions based on the streaming meter data, trend analyzer circuitry to generate a viewing trend indicator based on the active streaming sessions, and trend reporter circuitry to transmit the viewing trend indicator via a network.

Example 2 includes the apparatus of example 1, wherein the streaming meter data includes at least one of a viewing duration, device type, a media presentation application, and a media genre.

Example 3 includes the apparatus of example 2, wherein the meter data processor circuitry is to filter the active streaming sessions based on at least one of the device type, media presentation application, or media genre.

Example 4 includes the apparatus of example 3, wherein the trend analyzer circuitry is to generate the viewing trend indicator based on the filtered active streaming sessions.

Example 5 includes the apparatus of example 4, wherein the trend analyzer circuitry is to generate the viewing trend indicator based on a sum of viewing durations of the filtered active streaming sessions.

Example 6 includes the apparatus of example 3, wherein the meter data management circuitry to obtain, via the network, people meter data from a plurality of people meter devices, the people meter data including audience data.

Example 7 includes the apparatus of example 6, wherein the meter data processor circuitry is to filter the active streaming sessions based on the audience data.

Example 8 includes the apparatus of example 1, wherein the trend analyzer circuitry is to update the viewing trend indicator in response to the meter data management circuitry obtaining additional streaming meter data from the plurality of metering devices, and wherein the trend reporter circuitry is to transmit the updated viewing trend indicator via the network.

Example 9 includes the apparatus of example 8, wherein the trend analyzer circuitry is to update the viewing trend indicator in substantially real time.

Example 10 includes at least one non-transitory computer readable storage medium comprising instructions that, when executed, cause at least one processor to obtain, via a network, streaming meter data from a plurality of streaming meter devices, the streaming meter data including streaming sessions detected by the plurality of metering devices, identify active streaming sessions based on the streaming meter data, generate a viewing trend indicator based on the active streaming sessions, and transmit the viewing trend indicator via a network.

Example 11 includes the at least one non-transitory computer readable storage medium of example 10, wherein the streaming meter data includes at least one of a viewing duration, device type, a media presentation application, and a media genre.

Example 12 includes the at least one non-transitory computer readable storage medium of example 11, wherein the instructions cause the at least one processor to filter the active streaming sessions based on at least one of the device type, media presentation application, or media genre.

Example 13 includes the at least one non-transitory computer readable storage medium of example 12, wherein the instructions cause the at least one processor to generate the viewing trend indicator based on the filtered active streaming sessions.

Example 14 includes the at least one non-transitory computer readable storage medium of example 13, wherein the instructions cause the at least one processor to generate the viewing trend indicator based on a sum of viewing durations of the filtered active streaming sessions.

Example 15 includes the at least one non-transitory computer readable storage medium of example 12, wherein the instructions cause the at least one processor to obtain, via the network, people meter data from a plurality of people meter devices, the people meter data including audience data.

Example 16 includes the at least one non-transitory computer readable storage medium of example 15, wherein the instructions cause the at least one processor to filter the active streaming sessions based on the audience data.

Example 17 includes the at least one non-transitory computer readable storage medium of example 10, wherein the instructions cause the at least one processor to update the viewing trend indicator in response to obtaining additional streaming meter data from the plurality of metering devices, and wherein instructions cause the at least one processor to transmit the updated viewing trend indicator via the network.

Example 18 includes the at least one non-transitory computer readable storage medium of example 17, wherein the instructions cause the at least one processor to update the viewing trend indicator in substantially real time.

Example 19 includes a method, comprising obtaining, by executing instructions with at least one processor, via a network, streaming meter data from a plurality of streaming meter devices, the streaming meter data including streaming sessions detected by the plurality of metering devices, identifying, by executing instructions with the at least one processor, active streaming sessions based on the streaming meter data, generating, by executing instructions with the at least one processor, a viewing trend indicator based on the active streaming sessions, and transmitting, by executing instructions with the at least one processor, the viewing trend indicator via a network.

Example 20 includes the method of example 19, wherein the streaming meter data includes at least one of a viewing duration, device type, a media presentation application, and a media genre.

Example 21 includes the method of example 20, further including filtering the active streaming sessions based on at least one of the device type, media presentation application, or media genre.

Example 22 includes the method of example 21, further including generating the viewing trend indicator based on the filtered active streaming sessions.

Example 23 includes the method of example 22, further including generating the viewing trend indicator based on a sum of viewing durations of the filtered active streaming sessions.

Example 24 includes the method of example 21, further including obtaining, via the network, people meter data from a plurality of people meter devices, the people meter data including audience data.

Example 25 includes the method of example 24, further including filtering the active streaming sessions based on the audience data.

Example 26 includes the method of example 19, further including updating the viewing trend indicator in response to obtaining additional streaming meter data from the plurality of metering devices, and transmitting the updated viewing trend indicator via the network.

Example 27 includes the method of example 26, further including updating the viewing trend indicator in substantially real time.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A computing system comprising:
   at least one processor; and
   memory storing computer-readable instructions that, when executed by the at least one processor, cause the computing system to perform operations comprising:
   obtaining, via a network, streaming meter data from a plurality of streaming meter devices, the streaming meter data including streaming sessions detected by the plurality of streaming meter devices, wherein the plurality of streaming meter devices are located at a plurality of panelist households and configured to monitor streaming media content output by media presentation devices at the panelist households;
   identifying a subset of the streaming sessions as active streaming sessions based on a determination timing information for the subset of streaming sessions specified by the streaming meter data is within a threshold time of a current time;
   obtaining, via the network, people meter data from a plurality of people meter devices located at the panelist households, wherein the people meter data associates exposure to media to specific audience members the panelist households present during presentation of the media;
   determining demographics of the audience members based on the people meter data;
   based on the active streaming sessions, the people meter data, and the demographics, generating a viewing trend indicator of viewing trends of the streaming media content output by the media presentation devices during the active streaming sessions such that the viewing trend indicator correlates the viewing trends of the streaming media content with the demographics of the audience members ermined from the people meter data; and
   transmitting the viewing trend indicator via the network to a server to facilitate insertion of targeted media content relating to the viewing trend indicator into media content distributed by a streaming service provider.

2. The computing system of claim 1, wherein the streaming meter data includes at least one of a viewing duration, device type, a media presentation application, and a media genre.

3. The computing system of claim 2, the operations further comprising:
   filtering the active streaming sessions based on at least one of the device type, media presentation application, or media genre of the streaming meter data.

4. The computing system of claim 3, wherein generating the viewing trend indicator based on the active streaming sessions comprises generating the viewing trend indicator based on the filtered active streaming sessions.

5. The computing system of claim 4, wherein generating the viewing trend indicator based on the filtered active streaming sessions comprises generating the viewing trend indicator based on a sum of viewing durations of the filtered active streaming sessions.

6. The computing system of claim 1, wherein the demographics determined based on the people meter data comprise one or more of age or gender.

7. The computing system of claim 6, the operations further comprising:
filtering the active streaming sessions based on the demographics of the audience members.

8. The computing system of claim 1, the operations further comprising:
updating the viewing trend indicator based on obtaining additional streaming meter data from the plurality of streaming meter devices, and
transmitting the updated viewing trend indicator via the network.

9. The computing system of claim 1, wherein the viewing trend indicator is generated substantially in real time relative to the active streaming sessions to indicate a current viewing trend associated with one or more of a particular streaming service provider, age group, or media genre.

10. A non-transitory computer readable storage medium comprising instructions that, when executed, cause at least one processor to perform operations comprising:
obtaining, via a network, streaming meter data from a plurality of streaming meter devices, the streaming meter data including streaming sessions detected by the plurality of streaming meter devices, wherein the plurality of streaming meter devices are located at a plurality of panelist households and configured to monitor streaming media content output by media presentation devices at the panelist households;
identifying a subset of the streaming sessions as active streaming sessions based on a determination that timing information for the subset of streaming sessions specified by the streaming meter data is within a threshold time of a current time;
obtaining, via the network, people meter data from a plural of people meter devices located at the panelist households, wherein the people meter associates exposure to media to specific audience members of the panelist households present during presentation of the media;
determining demographics of the audience members based on the people meter data;
based on the active streaming sessions, the people meter data, and the demographics, generating a viewing trend indicator of viewing trends of the streaming media content output by the media presentation devices during the active streaming sessions such that the viewing trend indicator correlates the viewing trends of the streaming media content with the demographics of the audience members determined from the people meter data; and
transmitting the viewing trend indicator via the network to a server to facilitate insertion of targeted media content relating to the viewing trend indicator into media content distributed by a streaming service provider.

11. The non-transitory computer readable storage medium of claim 10, wherein the streaming meter data includes at least one of a viewing duration, device type, a media presentation application, and a media genre.

12. The non-transitory computer readable storage medium of claim 11, the operations further comprising:
filtering the active streaming sessions based on at least one of the device type, media presentation application, or media genre of the streaming meter data.

13. The non-transitory computer readable storage medium of claim 12, wherein generating the viewing trend indicator based on the active streaming sessions comprises generating the viewing trend indicator based on the filtered active streaming sessions.

14. The non-transitory computer readable storage medium of claim 13, wherein generating the viewing trend indicator based on the filtered active streaming sessions comprises generating the viewing trend indicator based on a sum of viewing durations of the filtered active streaming sessions.

15. The non-transitory computer readable storage medium of claim 10, wherein the demographics determined based on the people meter data comprise one or more of age or gender.

16. The non-transitory computer readable storage medium of claim 15, wherein the operations further comprising:
filtering the active streaming sessions based on the demographics of the audience members.

17. The non-transitory computer readable storage medium of claim 10, the operations further comprising:
updating the viewing trend indicator based on obtaining additional streaming meter data from the plurality of streaming meter devices, and
transmitting the updated viewing trend indicator via the network.

18. A method performed by a computing system comprising at least one processor, the method comprising:
obtaining, via a network, streaming meter data from a plurality of streaming meter devices, the streaming meter data including streaming sessions detected by the plurality of streaming meter devices, wherein the plurality of streaming meter devices are located at a plurality of panelist households and configured to monitor streaming media content output by media presentation devices at the panelist households;
identifying a subset of the streaming sessions as active streaming sessions based on a determination that timing information for the subset of streaming sessions specified by the streaming meter data is within a threshold time of a current time;
obtaining, via the network, people meter data from a plurality of people meter devices located at the panelist households, wherein the people meter data associates exposure to media to specific audience members of the panelist households present during presentation of the media;
determining demographics of the audience members based on the people meter data;
based on the active streaming sessions, the people meter data, and the demographics, generating a viewing trend indicator of viewing trends of the streaming media content output by the media presentation devices during the active streaming sessions such that the viewing trend indicator correlates the viewing trends of the streaming media content with the demographics of the audience members determined from the people meter data; and
transmitting the viewing trend indicator via the network to a server to facilitate insertion of targeted media content relating to the viewing trend indicator into media content distributed by a streaming service provider.

19. The method of claim 18, wherein the streaming meter data includes at least one of a viewing duration, device type, a media presentation application, and a media genre.

20. The method of claim 18, wherein the determination that the timing information for the subset of streaming sessions specified by the streaming meter data is within the threshold time of the current time comprises:

adding, for a particular streaming session of the subset of streaming sessions, a duration of the particular streaming session to a start time of the particular streaming session; and determining that the sum of the duration and the start time is within the threshold time of the current time.

* * * * *